United States Patent
Yim et al.

(10) Patent No.: US 9,734,782 B2
(45) Date of Patent: Aug. 15, 2017

(54) CURVED LIQUID CRYSTAL DISPLAY AND MANUFACTURING METHOD THEREOF

(71) Applicant: Samsung Display Co., Ltd., Yongin, Gyeonggi-do (KR)

(72) Inventors: Tae Kyung Yim, Seoul (KR); Hyun Ho Kang, Ansan-si (KR); O Sung Seo, Seoul (KR); Seung Jun Yu, Suwon-si (KR); Ha Won Yu, Suwon-si (KR); Ki Kyung Youk, Bucheon-si (KR); Yeo Geon Yoon, Suwon-si (KR); Sang Myoung Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 151 days.

(21) Appl. No.: 14/642,483

(22) Filed: Mar. 9, 2015

(65) Prior Publication Data
US 2016/0140919 A1 May 19, 2016

(30) Foreign Application Priority Data
Nov. 13, 2014 (KR) .......................... 10-2014-0158331

(51) Int. Cl.
*G09G 3/36* (2006.01)
*G02F 1/1335* (2006.01)

(52) U.S. Cl.
CPC ..... *G09G 3/3648* (2013.01); *G02F 1/133528* (2013.01); *G02F 2001/133531* (2013.01); *G09G 2300/0447* (2013.01); *G09G 2300/0842* (2013.01); *G09G 2320/0233* (2013.01); *G09G 2320/0285* (2013.01); *G09G 2320/0693* (2013.01)

(58) Field of Classification Search
CPC ................. G09G 3/3611; G02F 1/1334; G02F 1/133528; G02B 5/30
See application file for complete search history.

(56) References Cited

U.S. PATENT DOCUMENTS

| | | | | |
|---|---|---|---|---|
| 7,826,006 | B2 * | 11/2010 | Koganezawa | .... G02F 1/133611 349/56 |
| 2001/0048497 | A1 * | 12/2001 | Miyachi | ............ G02F 1/133634 349/117 |
| 2009/0079909 | A1 * | 3/2009 | Ouderkirk | ............. B29C 55/023 349/67 |
| 2010/0053222 | A1 * | 3/2010 | Kerofsky | ............. G09G 3/3406 345/690 |

FOREIGN PATENT DOCUMENTS

| | | |
|---|---|---|
| JP | 2003-262869 | 9/2003 |
| KR | 10-2010-0120022 | 11/2010 |
| KR | 10-2011-0061170 | 6/2011 |

* cited by examiner

*Primary Examiner* — Calvin C Ma
(74) *Attorney, Agent, or Firm* — Innovation Counsel LLP

(57) ABSTRACT

A curved liquid crystal display (LCD) includes a curved liquid crystal panel assembly. The curved liquid crystal panel assembly includes: a lower panel including a first linear polarizer having a first polarization axis; an upper panel including a second linear polarizer having a second polarization axis, the second polarization axis cross the first polarization axis in a plan view; and a liquid crystal layer interposed between the lower panel and the upper panel. An angle formed by a first polarization axis and a second polarization axis does not meet at a right angle in a plan view.

18 Claims, 18 Drawing Sheets

(a)

(b)

CURVED LIQUID CRYSTAL DISPLAY AND MANUFACTURING METHOD THEREOF

CROSS-REFERENCE TO RELATED APPLICATION

This application claims priority to and the benefit of Korean Patent Application No. 10-2014-0158331 filed in the Korean Intellectual Property Office on Nov. 13, 2014, the entire contents of which are incorporated herein by reference.

BACKGROUND (a) Field

Embodiments of the present inventive concept relates to a curved liquid crystal display (LCD) and a manufacturing method thereof, and more particularly, to a curved LCD and a driving method thereof that are capable of removing a luminance non-uniformity.

(b) Description of the Related Art

As one of the most widely used flat panel displays at present, a liquid crystal display (LCD) includes two display panels on which field generating electrodes such as a pixel electrode and a common electrode are formed, and a liquid crystal layer interposed between the two display panels. The LCD displays an image by generating an electric field on a liquid crystal layer by applying a voltage to the field generating electrodes, determining alignment directions of liquid crystal molecules of the liquid crystal layer by the generated electric field, and controlling polarization of incident light.

Recently, LCDs are becoming larger and are also being developed as a curved type to enhance immersion and realism of viewers.

By applying external force to a flat LCD, a curved LCD is being manufactured to have a constant curvature.

In this case, phase retardation of a glass substrate varies according to a shear stress due to a curvature, and accordingly, luminance non-uniformity occurs.

The luminance non-uniformity means a smudge in which a specific region is displayed brighter than the rest because of light leakage when a black screen is displayed.

Such luminance non-uniformity deteriorates display quality of the curved LCD.

The above information disclosed in this Background section is only for enhancement of understanding of the background of the inventive concept and therefore it may contain information that does not form the prior art.

SUMMARY

The present inventive concept has been made in an effort to provide a curved liquid crystal display (LCD) and a manufacturing method thereof that are capable of removing luminance non-uniformity generated in the curved LCD.

A curved LCD according to an exemplary embodiment of the present inventive concept includes a curved liquid crystal panel assembly. The curved liquid crystal panel assembly includes: a lower panel including a first linear polarizer having a first polarization axis; an upper panel including a second linear polarizer having a second polarization axis, the second polarization axis cross the first polarization axis in a plan view; and a liquid crystal layer interposed between the lower panel and the upper panel. An angle formed by a first polarization axis and a second polarization axis does not meet at a right angle in a plan view The second polarization axis of the second polarizer may form a predetermined angle from a direction of a third polarization axis that is perpendicular to the first polarization axis.

The first polarization axis of the first polarizer forms a predetermined angle from a direction of a fourth polarization axis that is perpendicular to the second polarization axis.

The first polarization axis of the first polarizer may form a first angle from a direction of a fourth polarization axis, and the second polarization axis of the second polarizer may form a second angle from a direction of a third polarization axis that is perpendicular to the fourth polarization axis.

The curved LCD may further includes a lookup table for storing correction values of an image signal, the lookup table including different values for a minimum gray level depending on a position of the curved liquid crystal panel assembly.

When a black image is displayed on the curved liquid crystal panel assembly, no electric field is configured to be applied to a luminance non-uniformity region, which has a lowest lookup table value for a minimum gray level, while an electric field is configured to be applied to a normal region other than the luminance non-uniformity region.

When a black image is displayed on the curved liquid crystal panel assembly, the voltage of the data signal applied to a luminance non-uniformity region, which has a lowest lookup table value for a minimum gray level, may be different from that of the data signal applied to a normal region other than the luminance non-uniformity region.

A curved LCD according to another exemplary embodiment of the present inventive concept includes: a curved liquid crystal panel assembly; a lookup table for storing correction values of image signals for a luminance non-uniformity region where luminance non-uniformity generated in the curved liquid crystal panel assembly appears and a normal region other than the luminance non-uniformity region; and a signal controller for generating an image data signal for displaying an image based on the correction values of the image signals.

The curved liquid crystal panel assembly may include: a lower panel including a first polarizer; an upper panel including a second polarizer; and a liquid crystal layer interposed between the lower panel and the upper panel. An angle formed by a first polarization axis of the first polarizer and a second polarization axis of the second polarizer may be crossing and do not meet at a right angle in a plan view.

The lookup table may include different values for a minimum gray level according to a position of the curved liquid crystal panel assembly.

The second polarization axis of the second polarizer may form a predetermined angle from a direction of a third polarization axis that is perpendicular to the first polarization axis.

The first polarization axis of the first polarizer may form a predetermined angle from a direction of a fourth polarization axis that is perpendicular to the second polarization axis.

A manufacturing method of a curved LCD according to a further exemplary embodiment of the present inventive concept includes: preparing a curved liquid crystal panel assembly including a lower panel including a first polarizer, an upper panel including a second polarizer, and a liquid crystal layer interposed between the lower panel and the upper panel; applying a data signal for displaying a black image to the liquid crystal panel assembly; detecting a region having the highest luminance from a screen of the liquid crystal panel assembly; adjusting luminance of an entire screen of the liquid crystal panel assembly to have the same luminance of the region having the highest luminance; and adjusting at least one of polarization axes of the first and second polarizers such that the entire screen has the lowest luminance.

The polarization axes of the first and the second polarizers may cross each other and do not meet at a right angle in a plan view.

The second polarization axis of the second polarizer may form a predetermined angle from a direction of a third polarization axis that is perpendicular to the first polarization axis.

The first polarization axis of the first polarizer may form a predetermined angle from a direction of a fourth polarization axis direction that is perpendicular to the second polarization axis.

The first polarization axis of the first polarizer may form a first angle from a direction of a fourth polarization axis, and the second polarization axis of the second polarizer may form a second angle from a direction of a third polarization axis that is perpendicular to the fourth polarization axis.

No electric field may be applied to the region having the highest luminance when applying a data signal for displaying a black image to the liquid crystal panel assembly.

A voltage of a data signal applied to each of a plurality of pixels corresponding to regions other than the region having the highest luminance may be adjusted to have the same luminance as the region having the highest luminance throughout the liquid crystal panel assembly.

The manufacturing method may further include storing correction values of image signals in a look-up table such that the voltages of the adjusted data signal corresponds to a minimum gray level of each image signal.

The luminance non-uniformity generated in the curved LCD can thus be removed.

DETAILED DESCRIPTION OF THE EMBODIMENTS

Figure 1:
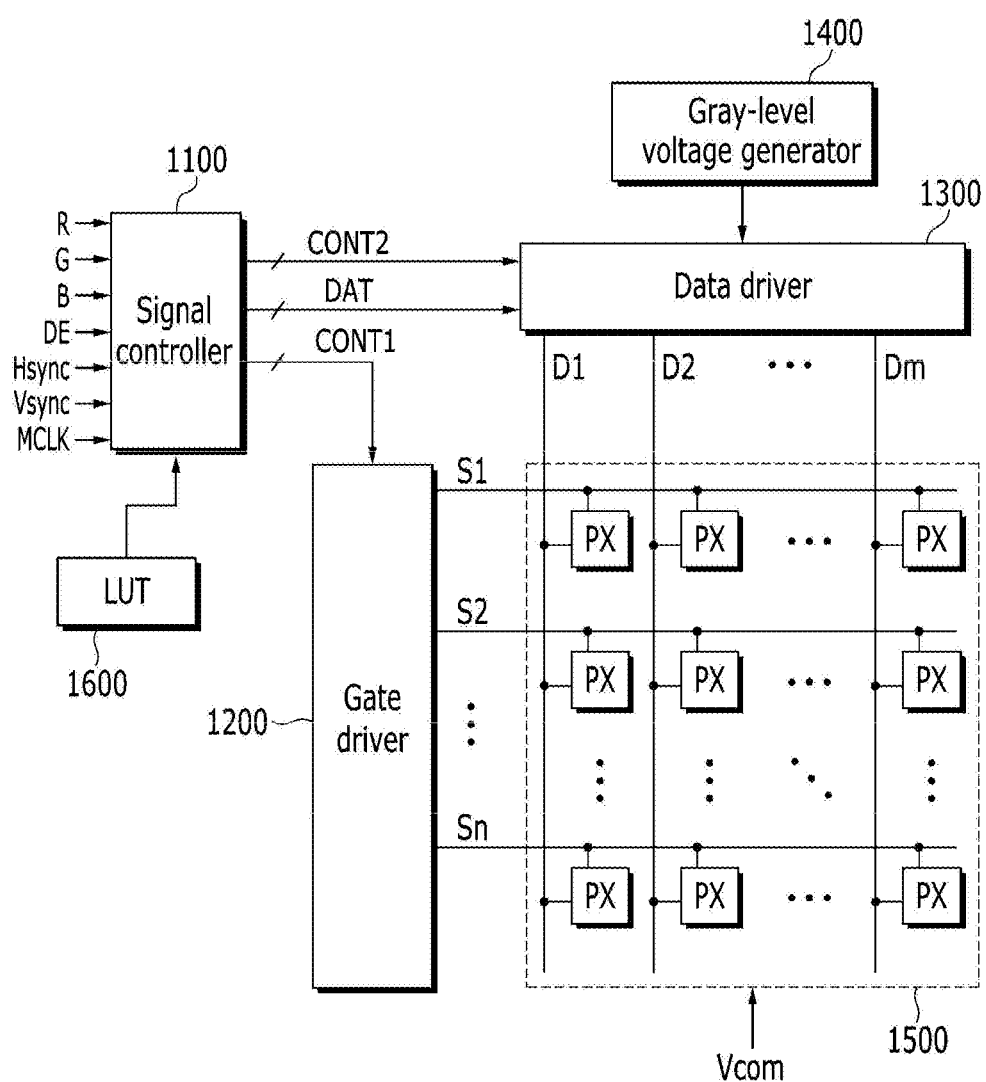
FIG. 1 is a block diagram of a curved liquid crystal display (LCD) according to an exemplary embodiment of the present inventive concept.

The present inventive concept will be described more fully hereinafter with reference to the accompanying drawings, in which exemplary embodiments of the inventive concept are shown.

As those skilled in the art would realize, the described embodiments may be modified in various different ways, all without departing from the spirit or scope of the present inventive concept.

Further, in various exemplary embodiments, since like reference numerals designate like elements having the same configuration, a first exemplary embodiment is representatively described, and in other exemplary embodiments, only different configurations from the first exemplary embodiment will be described.

Parts that are irrelevant to the description will be omitted to clearly describe the present inventive concept, and the same or similar constituent elements will be designated by the same reference numerals throughout the specification.

Throughout this specification and the claims that follow, when it is described that an element is "coupled" to another element, the element may be "directly coupled" to the other element or "electrically coupled" to the other element through a third element.

In addition, unless explicitly described to the contrary, the word "comprise" and variations such as "comprises" or "comprising" will be understood to imply the inclusion of stated elements but not the exclusion of any other elements.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element or intervening elements may also be present between the element and the another element.

In contrast, when an element is referred to as being "directly on" another element, there are no intervening elements present between the element and the another element.

A curved liquid crystal display (LCD) according to an exemplary embodiment of the present inventive concept will now be described in detail with reference to the drawings.

FIG. 1 is a block diagram of the curved LCD according to the exemplary embodiment of the present inventive concept.

Referring to FIG. 1, the curved liquid crystal display includes: a signal controller 1100; a gate driver 1200; a data driver 1300; a gray-level voltage generator 1400; a liquid crystal panel assembly 1500; and a look-up table 1600 (hereinafter referred to as a "LUT").

The liquid crystal panel assembly 1500 includes a plurality of gate lines S1 to Sn, a plurality of data lines D1 to Dm, and a plurality of pixels PXs.

The plurality of pixels PXs are arranged in an approximate matrix form while being connected to the plurality of gate lines S1 to Sn and the plurality of data lines D1 to Dm.

The plurality of gate lines S1 to Sn substantially extend in a row direction such that they are nearly parallel to each other.

The plurality of data lines D1 to Dm substantially extend in a column direction such that they are nearly parallel to each other.

In this case, the plurality of gate lines S1 to Sn and the plurality of data lines D1 to Dm are only illustrated to be connected to the plurality of pixels PXs, but various signal lines such as a power supply line, a divided reference voltage line, and the like may be additionally connected to the plurality of pixels PXs depending on a structure of the pixel PX, a driving method thereof, etc.

Meanwhile, backlights (not shown) may be provided at a rear side of the liquid crystal panel assembly 1500 to provide light to the liquid crystal panel assembly 1500. The backlights emit light to the liquid crystal panel assembly 1500.

The signal controller 1100 receives image signals R, G, and B and an input control signal.

The image signals R, G, and B contain luminance information of the plurality of pixels.

Luminance has a predetermined number of gray levels, for example, 1024 (=$2^{10}$), 256, (=$2^8$) or 64 (=$2^6$) gray levels.

The input control signal includes a data enable signal DE, a horizontal synchronization signal Hsync, a vertical synchronization signal Vsync, and a main clock signal MCLK.

The signal controller 1100 generates a gate control signal CONT1, a data control signal CONT2, and an image data signal DAT according to the image signals R, G, and B, the data enable signal DE, the horizontal synchronizing signal Hsync, the vertical synchronization signal Vsync, and the main clock signal MCLK.

The signal controller 1100 identifies the image signals R, G, and B for each frame according to the vertical synchronization signal Vsync and for each gate line according to the horizontal synchronization signal Hsync, thereby generating the image data signal DAT.

The signal controller 1100 may provide the image data signal DAT and the data control signal CONT2 to the data driver 1300.

As a signal for controlling an operation of the data driver 1300, the data control signal CONT2 includes a horizontal synchronization start signal STH for instructing a transmission start of the image data signal DAT, a load signal LOAD for instructing the data lines D1 to Dm to output a data signal, and a data clock signal HCLK.

The data control signal CONT2 may further include a reverse signal RVS for reversing a voltage polarity of the image data signal DAT with respect to a common voltage Vcom.

The signal controller 1100 provides the gate control signal CONT1 to the gate driver 1200.

The gate control signal CONT1 includes at least one clock signal for controlling output of a scanning start signal STV and a gate-on voltage of the gate driver 1200.

The gate control signal CONT1 may further include an output enable signal OE for limiting duration of the gate-on voltage.

The data driver 1300 is connected to the data lines D1 to Dm of the liquid crystal panel assembly 1500, and selects gray-level voltages from the gray-level voltage generator 1400.

The data driver 1300 applies the selected gray-level voltage as the data signal to the data lines D1 to Dm.

The gray-level voltage generator 1400 does not provide voltages for all gray levels but provides only a predetermined number of reference gray-level voltages.

In this case, the data driver 1300 may divide the reference gray-level voltages to generate the gray-level voltages for all the gray levels, and may select the data signal among them.

The gate driver 1200 applies a gate signal, which consists of a gate-on voltage and a gate-off voltage for respectively turning the switching elements (Qa, Qb, and Qc of FIG. 2) connected to the gate lines S1 to Sn of the liquid crystal panel assembly 1500 on and off, to the gate lines S1 to Sn.

Meanwhile, the liquid crystal panel assembly 1500 is a curved LCD.

Since the liquid crystal panel assembly 1500 is curved, luminance non-uniformity occurs.

The luminance non-uniformity means a smudge in which a specific region is displayed brighter than the rest because of light leakage when a black screen is displayed.

The luminance non-uniformity may appear on a predetermined specific region depending on shear stress and the like that are applied to the liquid crystal panel assembly 1500.

The curved liquid crystal panel assembly 1500 and the luminance non-uniformity will be described later in more detail with reference to FIGS. 5 and 6.

Meanwhile, the liquid crystal panel assembly 1500 includes a first polarizer and a second polarizer.

The first polarizer may be included in a lower panel, while the second polarizer may be included in an upper panel.

Originally, the first and second polarizers have polarization axes that are perpendicular to each other.

However, in the liquid crystal panel assembly 1500 of the present inventive concept, directions of the polarization axes of the first and second polarizers are adjusted to remove the luminance non-uniformity.

Accordingly, an angle formed by the two polarization axes of the first and second polarizers is deviated by a predetermined angle (90°+a or 90°−a) from an angle (90°) at which they are perpendicular to each other.

That is, in the liquid crystal panel assembly 1500, the first and second polarizers have polarization axes that are not perpendicular to each other.

The angle formed by the two polarization axes of the first and second polarizers may be determined during a manufacturing process of the curved LCD to be described later in FIG. 9.

During the manufacturing process of the curved LCD, the luminance non-uniformity may occur when a black data signal is applied to the curved liquid crystal panel assembly 1500.

After adjusting luminance of the entire screen to luminance of a part of a luminance non-uniformity region having the highest luminance where the luminance non-uniformity appears, a direction of the polarization axis of at least either one of the first and second polarizers is rotated by a predetermined angle such that the entire screen has the lowest luminance.

The angle formed by the two polarization axes of the first and second polarizers is determined to have the lowest luminance.

The LUT 1600 stores correction values for the image signals R, G, and B. The LUT including different values for a minimum gray level depending on a position of the curved liquid crystal panel assembly.

That is, the LUT 1600 stores correction values of the image signals R, G, and B for a luminance non-uniformity region where the luminance non-uniformity of the liquid crystal panel assembly 1500 appears and a normal region other than the luminance non-uniformity region.

The LUT 1600 may be provided as a non-volatile memory (flash electrically erasable programmable read-only memory) or the like.

The correction values of the image signals R, G, and B stored in the LUT 1600 may be determined in a manufacturing process of the curved LCD to be described later in FIG. 9.

During the manufacturing process of the curved LCD, when the data signal for generating no electric field is applied to the curved liquid crystal panel assembly 1500, a voltage of the data signal applied to each of the plurality of pixels PXs is adjusted to allow luminance of an entire screen to be adjusted to have a luminance of a luminance non-uniformity region having the highest luminance.

In this case, the voltage of the adjusted data signal corresponds to a voltage of a gray level 0 for each of the plurality of pixels PX.

The correction values of the image signals R, G, and B may be determined such that the gray level 0 of the image signals R, G, and B correspond to the voltage of the adjusted data signal.

As such, the determined correction values of the image signals R, G, and B are stored in the LUT 1600.

The correction values of the image signals R, G, and B that are stored in the LUT 1600 are provided to the signal controller 1100.

The signal controller 1100 generates the image data signal DAT based on the correction values of the image signals R, G, and B that are received from the LUT 1600.

The image data signal DAT includes the image signals R, G, and B that are divided based on each frame and each gate line, and the signal controller 1100 may correct gray-level values of the image signals R, G, and B corresponding to the normal region based on the correction values that are received from the LUT 1600.

During the manufacturing process of the curved LCD, it is assumed that the luminance of the region having the highest luminance and the luminance of the other luminance non-uniformity region are identical to each other.

In this case, for the same gray level, the image data signal DAT of the luminance non-uniformity region and the image data signal DAT of the normal region may have different values.

Accordingly, for the same gray level, the voltages of the data signal outputted from the data driver 1300 are different from each other in the luminance non-uniformity region and in the normal region.

Particularly, when a black image is displayed, the voltage of the data signal applied to the luminance non-uniformity region is different from and that of the data signal applied to the normal region.

The black image means an image of the lowest gray level, while a white image means an image of the highest gray level.

When the black image is displayed on the liquid crystal panel assembly 1500, the voltage of the data signal applied to the luminance non-uniformity region may not generate an electric field in the liquid crystal panel assembly 1500, while the voltage of the data signal applied to the normal region may generate a predetermined electric field in the liquid crystal panel assembly 1500.

Meanwhile, the LUT 1600 is described to be separately provided from the signal controller 1100, but the LUT 1600 may be included in the signal controller 1100.

The signal controller 1100, the gate driver 1200, the data driver 1300, and the gray-level voltage generator 1400 that are described above may be directly mounted on the liquid crystal panel assembly 1500 or on a flexible printed circuit film (not shown) as at least one IC chip, or may be attached to the liquid crystal panel assembly 1500 or mounted on a printed circuit board (PCB) (not shown) as a tape carrier package (TCP).

Alternatively, the signal controller 1100, the gate driver 1200, the data driver 1300, and the gray-level voltage generator 1400 may be integrated into the liquid crystal panel assembly 1500 along with the signal lines S1 to Sn and D1 to Dm.

Figure 2:
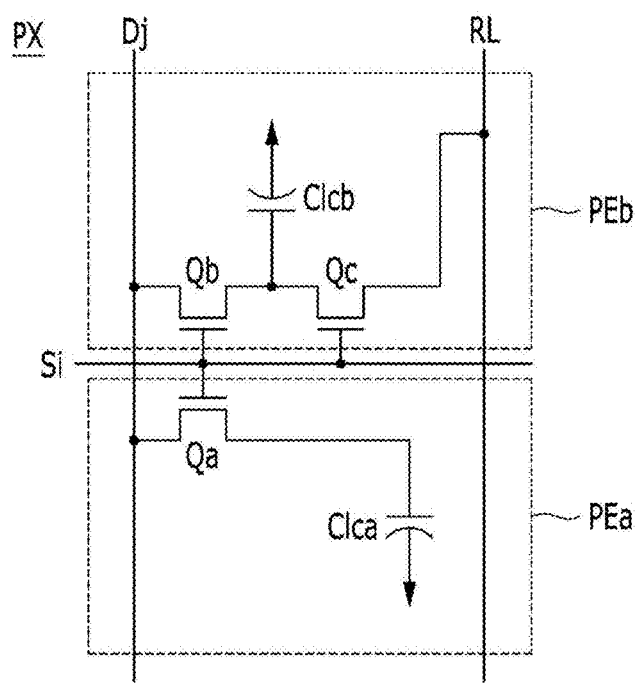
FIG. 2 is a circuit diagram of one pixel of the curved LCD according to the exemplary embodiment of the present inventive concept.

FIG. 2 is a circuit diagram of one pixel of the curved LCD according to the exemplary embodiment of the present inventive concept.

A circuit structure of the pixel of the curved LCD according to the exemplary embodiment of the present inventive concept and a driving method thereof will now be described with reference to FIG. 2.

One pixel PX included in the curved LCD includes first to third switching elements Qa, Qb, and Qc, and first and second liquid crystal capacitors Clca and Clcb.

The first and second switching elements Qa and Qb are respectively connected to a gate line Si and a data line Dj.

The third switching element Qc is connected to the gate line Si, an output terminal of the second switching element Qb, and a divided reference voltage line RL.

The first and second switching elements Qa and Qb are three-terminal elements such as a thin film transistor and the like, control terminals thereof are connected to the gate line Si, and input terminals thereof are connected to the data line Dj.

An output terminal of the first switching element Qa is connected to the first liquid crystal capacitor Clca.

An output terminal of the second switching element Qb is connected to the second liquid crystal capacitor Clcb and an input terminal of the third switching element.

The third switching element Qc is also a three-terminal element such as a thin film transistor and the like, a control terminal thereof is connected to the gate line Si, an input terminal thereof is connected to the second liquid crystal capacitor Clcb, and an output terminal thereof is connected to the divided reference voltage line RL.

When a gate-on signal is applied to the gate line Si, the first, second, and third switching elements Qa, Qb, and Qc connected thereto are turned on.

In this case, a data signal is applied to the data line Dj, and the data signal applied to the data line Dj is applied to a first subpixel electrode PEa through the turned-on first switching element Qa and to a second subpixel electrode PEb through the turned-on second switching element Qb.

Since the data signals applied to the first and second subpixel electrodes PEa and PEb are identical to each other, the first and second liquid crystal capacitors Clca and Clcb are charged with the same amount of charges corresponding to a difference between a common voltage and the data voltage, and simultaneously, a voltage charged in the second liquid crystal capacitor Clcb is divided by the turned-on third switching element Qc.

Thus, the voltage charged to the second liquid crystal capacitor Clcb is decreased by a difference between the common voltage and the divided reference voltage.

Since the voltages of the first and second liquid crystal capacitors Clca and Clcb are different from each other, tilt angles of liquid crystal molecules of the first and second subpixels are different, thereby obtaining the two subpixels of different luminances.

Accordingly, when the voltages of the first and second liquid crystal capacitors Clca and Clcb are appropriately adjusted, an image viewed from the front is as close as possible to an image viewed from a side, thereby improving side visibility.

In this case, the circuit of the pixel shown in FIG. 2 is described, but the pixel of the curved LCD according to the exemplary embodiment of the present inventive concept is not limited thereto and may be formed to have various structures.

A structure of the liquid crystal panel assembly 1500 of the curved LCD according to the exemplary embodiment of the present inventive concept will now be described with reference to FIGS. 3 and 4.

Figure 3:
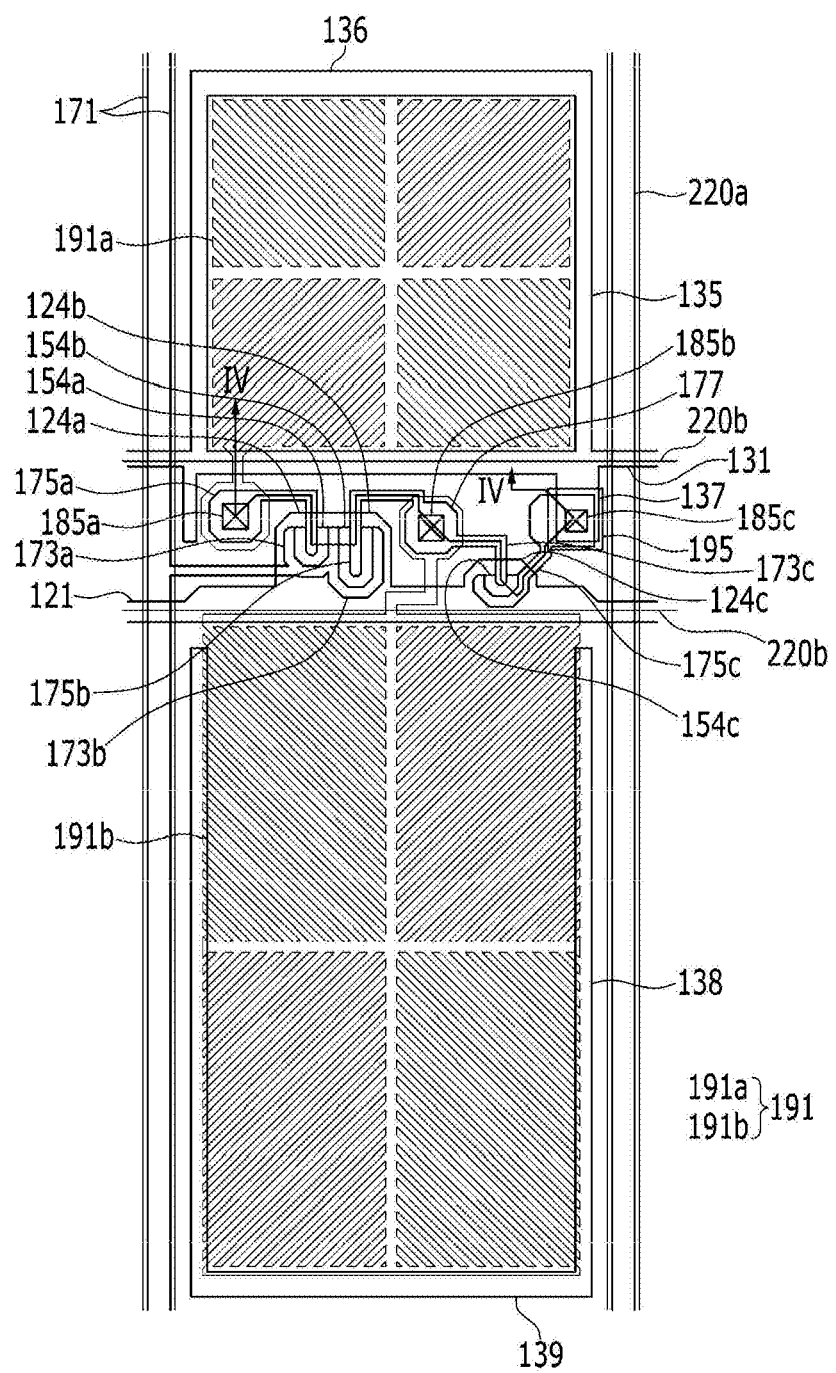
FIG. 3 is a top plan view of one pixel of the curved LCD according to the exemplary embodiment of the present inventive concept.

FIG. 3 is a top plan view of one pixel of the curved LCD according to the exemplary embodiment of the present inventive concept.

Figure 4:
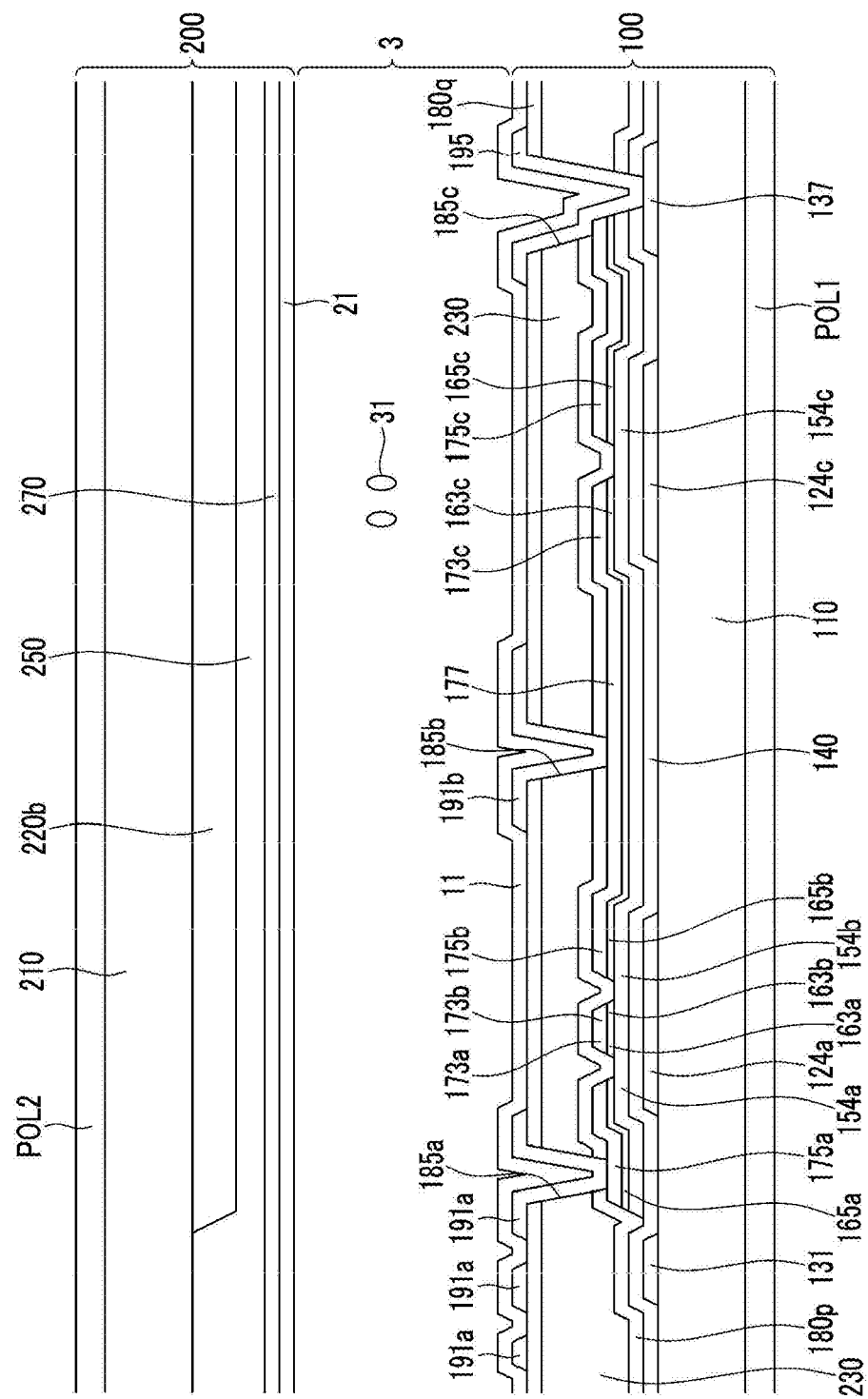
FIG. 4 is a cross-sectional view of FIG. 3 taken along the line IV-IV.

FIG. 4 is a cross-sectional view of FIG. 3 taken along the line IV-IV.

Referring to FIGS. 3 and 4, the curved LCD includes lower and upper panels 100 and 200 facing each other, and a liquid crystal layer 3 including liquid crystal molecules 31 that are interposed between the two display panels 100 and 200.

A pair of polarizers POL1 and POL2 are attached to outer surfaces of the two panels 100 and 200.

The lower panel 100 will be described first.

A first polarizer POL1 is disposed under a first insulation substrate 110 that is formed of transparent glass or plastic.

A gate conductor including a gate line 121 and a divided reference voltage line 131 is disposed on the first insulation substrate 110.

The gate line 121 includes a first gate electrode 124a, a second gate electrode 124b, a third gate electrode 124c, and a wide end portion (not shown) for connection with another layer or an external driving circuit.

The divided reference voltage line 131 includes first storage electrodes 135 and 136, and a reference electrode 137.

Although not connected to the divided reference voltage line 131, second storage electrodes 138 and 139 are also disposed to overlap a second subpixel electrode 191b.

A gate insulating layer 140 is disposed on the gate line 121 and the divided reference voltage line 131, and a first semiconductor layer 154a, a second semiconductor layer 154b, and a third semiconductor layer 154c are disposed on the gate insulating layer 140.

A plurality of ohmic contacts 163a, 165a, 163b, 165b, 163c, and 165c are disposed on the semiconductor layers 154a, 154b, and 154c.

A plurality of data lines 171 including first and second source electrodes 173a and 173b and a data conductor including a first drain electrode 175a, a second drain electrode 175b, a third source electrode 173c, and a third drain electrode 175c are disposed on the ohmic contacts 163a, 165a, 163b, 165b, 163c, and 165c and the gate insulating layer 140.

The data conductors, along with the semiconductor and the ohmic contacts disposed thereunder, may be simultaneously formed using one mask.

The data line 171 includes a wide end portion (not shown) for connection with another layer or an external driving circuit, and may include the semiconductor layers 154a, 154b, and 154c and the ohmic contacts 163a, 165a, 163b, 165b, 163c, and 165c that have the same planar shape.

The first gate electrode 124a, the first source electrode 173a, and the first drain electrode 175a form one first thin film transistor Qa along with the first semiconductor layer 154a.

A channel of the first thin film transistor Qa is formed in the first semiconductor layer 154a between the first source electrode 173a and the first drain electrode 175a.

Similarly, the second gate electrode 124b, the second source electrode 173b, and the second drain electrode 175b form one second thin film transistor Qb along with the second semiconductor layer 154b.

A channel of the second thin film transistor Qb is formed in the second semiconductor layer 154b between the second source electrode 173b and the second drain electrode 175b.

The third gate electrode 124c, the third source electrode 173c, and the third drain electrode 175c form one third thin film transistor along with the third semiconductor layer 154c.

A channel of the third thin film transistor Qc is formed in the third semiconductor layer 154c between the third source electrode 173c and the third drain electrode 175c.

The second drain electrode 175b is connected to the third source electrode 173c and includes a wide expansion 177.

A first passivation layer 180p is disposed on the data conductors 171, 173c, 175a, 175b, and 175c and exposed portions of the semiconductor layers 154a, 154b, and 154c.

The first passivation layer 180p may be an inorganic insulating layer that is formed of a silicon nitride, a silicon oxide, etc.

The first passivation layer 180p may prevent a pigment of a color filter 230 from flowing into the exposed portions of the semiconductor layers 154a, 154b, and 154c.

A vertical light blocking member 220a and the color filter 230 are disposed on the first passivation layer 180p.

Either one of the vertical light blocking member 220a and the color filter 230 may be disposed on the other one of the vertical light blocking member 220a and the color filter 230.

The vertical light blocking member 220a may have a planar shape that is identical or similar to the data line 171, and is formed to cover the data line 171.

In this case, the light blocking member 220a extending in the vertical direction is described, but the present inventive concept is not limited thereto, and a shielding electrode which is simultaneously formed with the pixel electrode and to which the common voltage is applied may be applied instead of the light blocking member.

The color filter 230 extends in the vertical direction along two data lines adjacent to each other.

Two adjacent color filters 230 may be spaced apart based on the data lines 171, or may overlap each other in vicinities of the data lines 171.

The color filter 230 may uniquely display one of primary colors, and the primary colors may be, for example, three primary colors such as red, green, and blue, or yellow, cyan, magenta, and the like.

Though not illustrated, the color filter 230 may further include a color filter for displaying mixed colors of the primary colors in addition to the primary colors or white.

A second passivation layer 180q is disposed on the vertical light blocking member 220a and the color filter 230.

The second passivation layer 180q may be an inorganic insulating layer that is formed of a silicon nitride, a silicon oxide, etc.

The second passivation layer 180q prevents the color filter 230 from being lifted and suppresses contamination of the liquid crystal layer 3 by an organic material such as a solvent introduced from the color filter 230, thereby preventing display defects such as a residual image that may appear when a screen is driven.

A first contact hole 185a and a second contact hole 185b are formed in the first passivation layer 180p, the color filter 230, and the second passivation layer 180q to respectively expose the first and second drain electrodes 175a and 175b.

A third contact hole 185c is disposed in the first passivation layer 180p, the second passivation layer 180q, and the gate insulating layer 140 to partially expose both of the reference electrode 137 and the third drain electrode 175c.

A connecting member 195 covers the third contact hole 185c.

The connecting member 195 electrically couples the reference electrode 137 and the third drain electrode 175c that are exposed by the third contact hole 185c.

A plurality of pixel electrodes 191 are disposed on the second passivation layer 180q.

The pixel electrodes 191 are separated from each other while interposing the gate line 121 therebetween, and include a first subpixel electrode 191a and a second subpixel electrode 191b neighboring each other in a column direction with the gate line 121 interposed between the first subpixel electrode 191a and the second subpixel electrode 191b.

The pixel electrode 191 may be formed of a transparent conductive material such as ITO, IZO, or the like, or a reflective metal such as aluminum, silver, chromium, or an alloy thereof.

The first subpixel electrode 191a is physically and electrically connected to the first drain electrode 175a through the first contact hole 185a, and is applied with the data signal from the first drain electrode 175a.

The second subpixel electrode 191b is physically and electrically connected to the second drain electrode 175b through the second contact hole 185b, and is applied with the data signal from the second drain electrode 175b.

The data signal applied to the second drain electrode 175b may be partially divided by the third source electrode 173c such that a voltage applied to the first subpixel electrode 191a is greater than that applied to the second subpixel electrode 191b.

The first and second subpixel electrodes 191a and 191b to which the data signal is applied generate an electric field along with a common electrode 270 of the upper panel 200 to be described later, thereby determining directions of the liquid crystal molecules of the liquid crystal layer 3 between the two electrodes 191 and 270.

Luminance of light passing through the liquid crystal layer 3 varies depending on the determined directions of the liquid crystal molecules.

A lower alignment layer 11 is disposed on the pixel electrode 191.

The upper panel 200 will now be described.

A horizontal light blocking member 220b is disposed on an insulation substrate 210.

The horizontal light blocking member 220b is referred to as a black matrix (BM) and prevents leakage of light.

The horizontal light blocking member 220b may be disposed to correspond to the gate line 121.

That is, the horizontal light blocking member 220b extending in the row direction may be provided.

The second polarizer POL2 is disposed under the second insulation substrate 210, that is, at an opposite side of the horizontal light blocking member 220b.

An overcoat 250 is formed on the light blocking member 220b.

The overcoat 250 may be formed of an organic insulating material, and provides a flat surface.

In some exemplary embodiments, the overcoat 250 may be omitted.

The common electrode 270 is formed on the overcoat 250.

The common electrode 270 may be formed of a transparent conductor such as ITO, IZO, etc.

An upper alignment layer 21 is formed on the common electrode 270.

The liquid crystal layer 3 includes the plurality of liquid crystal molecules 31, and the liquid crystal molecules 31 are aligned such that they are perpendicular to surfaces of the two substrates 110 and 210 when no voltage is applied to the two field generating electrodes 191 and 270.

The liquid crystal molecules 31 may be aligned to have pretilts that are tilted in the same direction as a length direction of cutout patterns of the pixel electrode 191.

Luminance non-uniformity generated in the curved liquid crystal panel assembly 1500 of the curved LCD and a method for removing the luminance non-uniformity will now be described.

Figure 5:
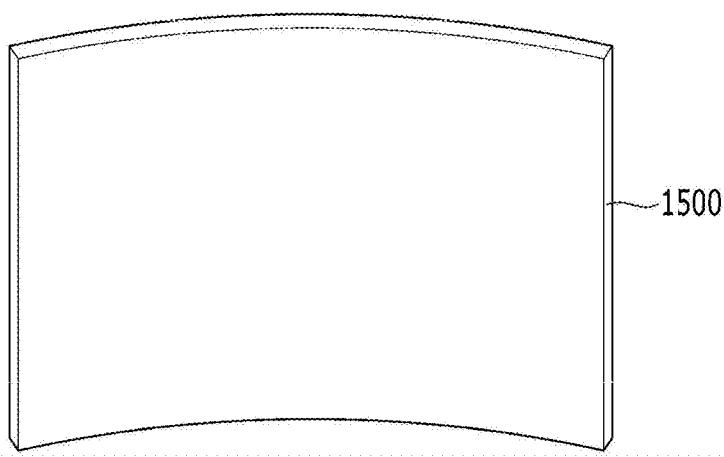
FIGS. 5 (a) and (b) are drawings schematically illustrating curved liquid crystal panel assemblies of the curved LCD according to the exemplary embodiment of the present inventive concept.
Figure 5:
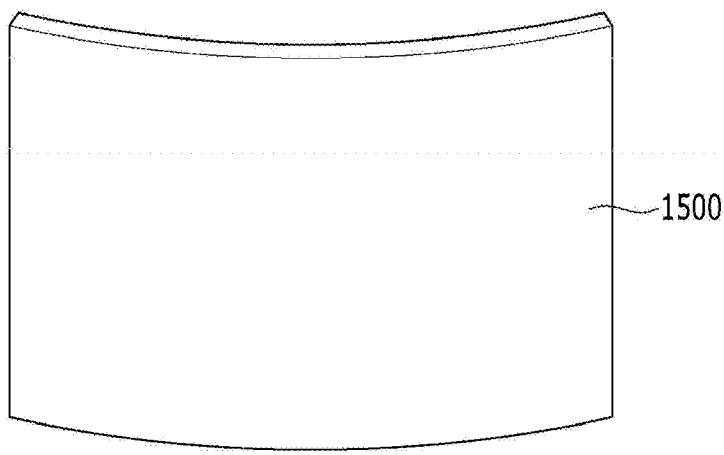

FIGS. 5 (a) and (b) are drawings schematically illustrating curved liquid crystal panel assemblies of the curved LCD according to the exemplary embodiment of the present inventive concept.

Referring to FIG. 5, the liquid crystal panel assembly 1500 of the curved LCD may be formed as a concave type as shown in FIG. 5 (a) or a convex type as shown in FIG. 5 (b).

The concave type is curved to be a center portion of the liquid crystal panel assembly 1500 away from a viewer, while the convex type is curved to be a center portion of the liquid crystal panel assembly 1500 closer to a viewer.

The concave type or the convex type of liquid crystal panel assembly 1500 may be formed to have a constant curvature, or may be formed to have multiple curvatures such that a curvature of the center portion of the liquid crystal panel assembly 1500 is different from that of the opposite lateral edge portions.

Particularly, the liquid crystal panel assembly 1500 formed to have the constant curvature is likely to have more severe luminance non-uniformity than that formed to have the multiple curvatures.

Hereinafter, it is assumed that the liquid crystal panel assembly 1500 is formed as the concave type.

Figure 6:
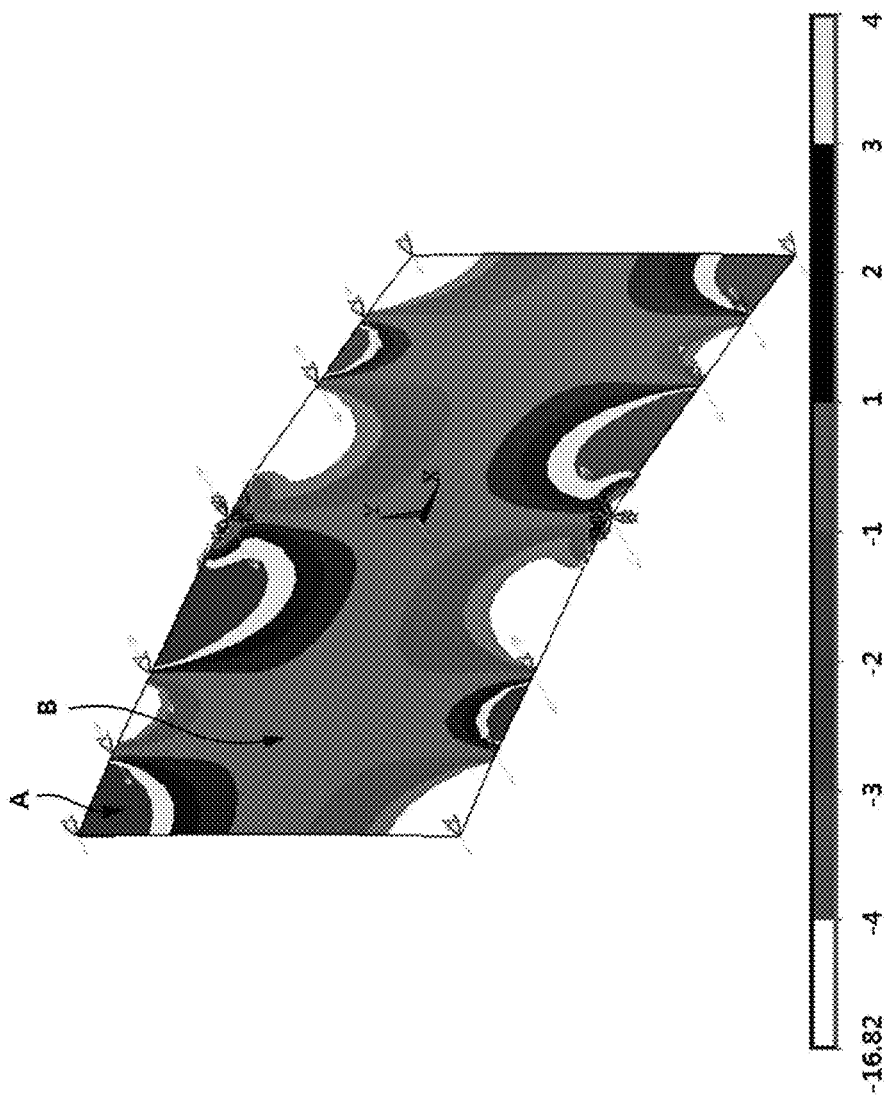
FIG. 6 is a drawing illustrating a simulation result of shear stress applied to the curved liquid crystal panel assembly of the curved LCD according to the exemplary embodiment of the present inventive concept.

FIG. 6 is a drawing illustrating a simulation result of shear stress applied to the curved liquid crystal panel assembly of the curved LCD according to the exemplary embodiment of the present inventive concept.

Referring to FIG. 6, when the liquid crystal panel assembly 1500 has the constant curvature or multiple curvatures due to an external force, a shear stress is generated in the liquid crystal panel to maintain a state before the application of the external force.

As illustrated therein, on a screen of the liquid crystal panel assembly 1500, a region A where the shear stress occurs is distributed in upper and lower edge portions, and a region B where relatively less shear stress occurs is distributed in a center portion.

The distribution of the region A where the shear stress occurs is determined by a radius of curvature of the liquid crystal panel assembly 1500, thicknesses of the first and second insulation substrates 110 and 210, etc.

The region A where the shear stress occurs substantially corresponds to the luminance non-uniformity region where the luminance non-uniformity actually occurs.

The distribution of the luminance non-uniformity region may also be determined by the radius of curvature of the liquid crystal panel assembly 1500, the thicknesses of the first and second insulation substrates 110 and 210, etc.

If the radius of curvature of the liquid crystal panel assembly 1500, the thicknesses of the first and second insulation substrates 110 and 210, etc., have a predetermined specification, the distribution of the luminance non-uniformity region can be predicted.

Figure 7:
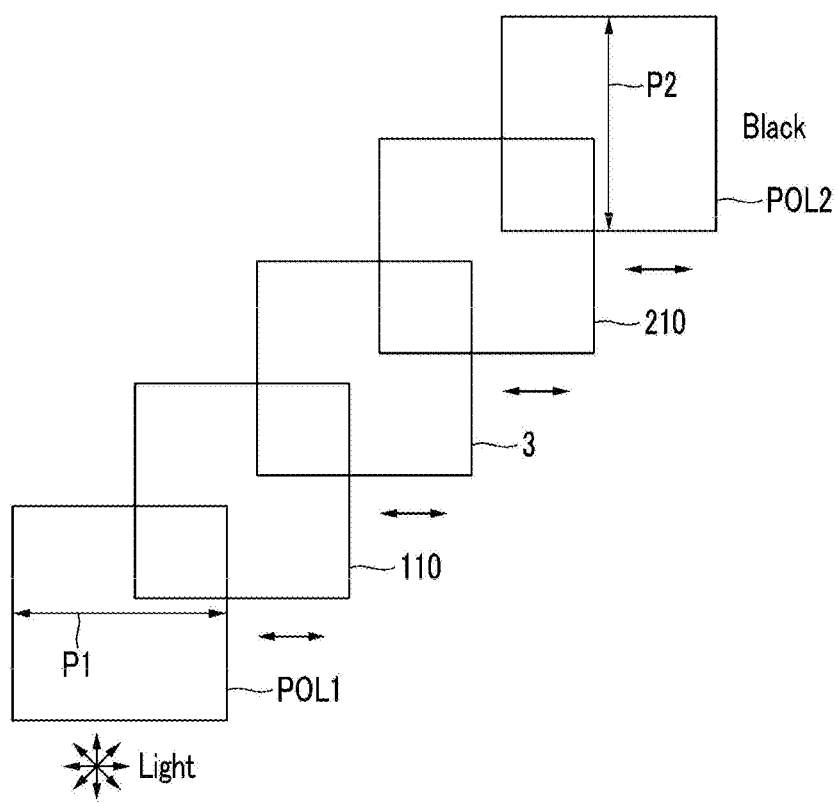
FIG. 7 is a top plan view for illustrating polarization variations in a normal region where no luminance non-uniformity occurs.
Figure 8:
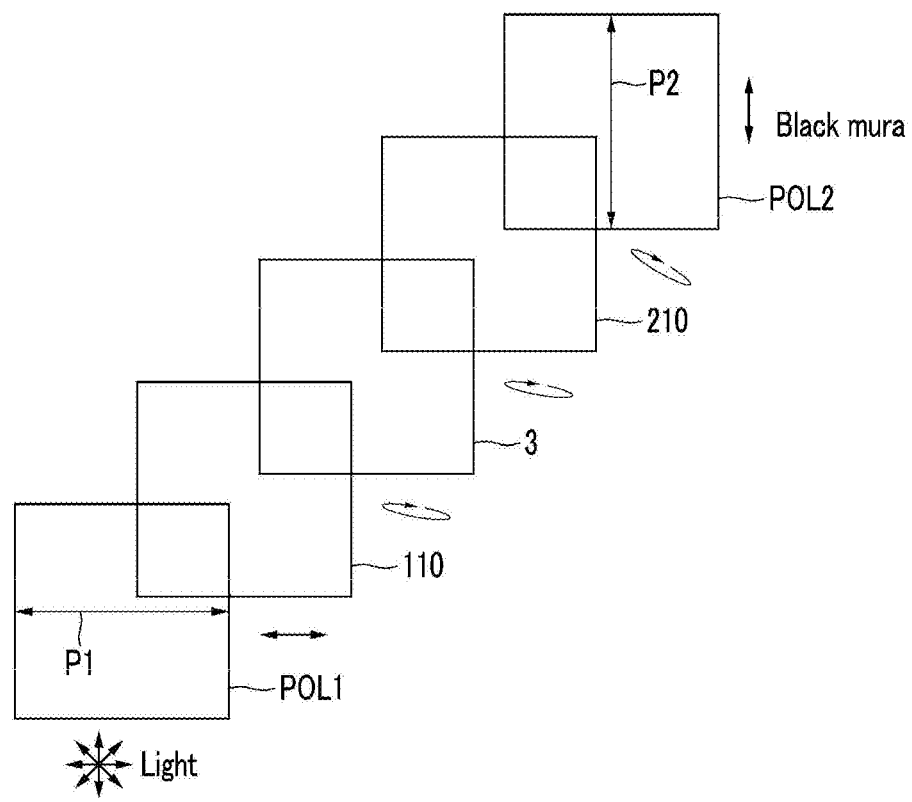
FIG. 8 is a top plan view for illustrating polarization variations in a luminance non-uniformity region where luminance non-uniformity occurs.

Referring to FIGS. 7 and 8, when the polarization axes of the first and second polarizers POL1 and POL2 are not adjusted, that is, when the first and second polarization axes P1 and P2 are perpendicular to each other, polarization variations in the luminance non-uniformity region and in the normal region will now be described.

First, referring to FIG. 7, for when the curved LCD displays a black image, the polarization variations in the normal region will be described.

The normal region corresponds to the region B where no shear stress occurs.

FIG. 7 is a top plan view for illustrating the polarization variations in the normal region where no luminance non-uniformity occurs.

Referring to FIG. 7, in the structure of liquid crystal panel assembly 1500 of the curved LCD described in FIGS. 3 and 4, the first polarizer POL1, the first insulation substrate 110, the liquid crystal layer 3, the second insulation substrate 210, and the second polarizer POL2 contribute to the polarization variations of the light emitted from the backlight.

The light emitted from the backlight is unpolarized light in which electric fields in all directions are substantially uniformly included.

Polarized light vibrating in one direction along a first polarization axis P1 is transmitted through the first polarizer POL1.

The light emitted from the backlight becomes the polarized light in the direction of the first polarization axis P1 after passing through the first polarizer POL1. The first polarization axis P1 may be parallel to one edge of the liquid crystal panel assembly.

The normal region corresponds to the region B where no shear stress occurs, the polarized light in the direction of the first polarization axis P1 is transmitted through the first insulation substrate 110 with its polarization unchanged since the first insulation substrate 110 is an isotropic body.

Since the LCD displays the black image and the electric field is not applied to the liquid crystal layer 3, the polarized light in the direction of the first polarization axis P1 is transmitted through the liquid crystal layer 3 with its polarization unchanged.

Since the second insulation substrate 210 is also an isotropic body, the polarized light in the direction of the first polarization axis P1 is transmitted through the second insulation substrate 210 with its polarization unchanged.

The second polarizer POL2 has a second polarization axis P2 that is perpendicular to the first polarization axis P1 of the first polarizer POL1. The second polarization axis P2 may be parallel to the other edge, which is adjacent to the one edge of the liquid crystal panel assembly.

The polarized light in the direction of the first polarization axis P1 is not allowed to pass through the second polarizer POL2.

Accordingly, the black image may be displayed.

Next, referring to FIG. 8, when the curved LCD displays the black image, the polarization variations in the luminance non-uniformity region will be described.

The luminance non-uniformity region corresponds to the region A where the shear stress occurs.

FIG. 8 is a top plan view for illustrating polarization variations in the luminance non-uniformity region where the luminance non-uniformity occurs.

Referring to FIG. 8, light emitted from the backlight which passes through the first polarizer POL1 has the polarization axis P1 because it is polarized by a linear polarizer POL1.

The luminance non-uniformity region corresponds to the region A where the shear stress occurs, and the first insulation substrate 110, which is a transparent body, does not maintain an optically isotropic characteristic due to the shear stress but has birefringence.

That is, the first and second insulation substrates 110 and 210 are formed of glass or plastic, which is an isotropic and homogeneous transparent material, and the first and second insulation substrates 110 and 210 do not become the optically isotropic body but have birefringence when the external force is applied such that the first and second insulation substrates 110 and 210 have curvatures.

A degree of birefringence is proportional to the external force.

The polarized light in the direction of the first polarization axis P1 becomes elliptically polarized light when passing through the transparent body having birefringence, that is, the first insulation substrate 110.

In the elliptically polarized light, an end of a vibration vector of a light wave describes an ellipse in any fixed plane intersecting, and normal to, the direction of propagation.

When viewed by a viewer in a travelling direction, the elliptically polarized light may be either one of right elliptically polarized light rotating in a clockwise direction and left elliptically polarized light rotating in a counterclockwise direction.

The elliptically polarized light may be a combination of two linearly polarized lights vibrating in directions that are perpendicular to each other.

That is, a polarization component in the direction of the first polarization axis P1 and a polarization component in the direction of the second polarization axis P2 are included in the elliptically polarized light.

Since the LCD displays the black image and no electric field is applied to the liquid crystal layer 3, the elliptically polarized light is transmitted through the liquid crystal layer 3 with its polarization unchanged.

Since the second insulation substrate 210 also has birefringence, the elliptically polarized light may become the elliptically polarized light with the polarization component in the direction of the second polarization axis P2 further increased after passing through the second insulation substrate 210.

The polarization component in the direction of the second polarization axis P2 included in the elliptically polarized light is transmitted through the second polarizer POL2.

After being transmitted through the second polarizer POL2, the polarized light in the direction of the second polarization axis P2 is recognized by a user.

Accordingly, the luminance non-uniformity where a specific area is displayed brighter than its surrounding areas is generated in the black image.

A manufacturing method of the curved LCD for removing the luminance non-uniformity according to the exemplary embodiment of the present inventive concept will now be described with reference to FIGS. 9 to 12.

Figure 9:
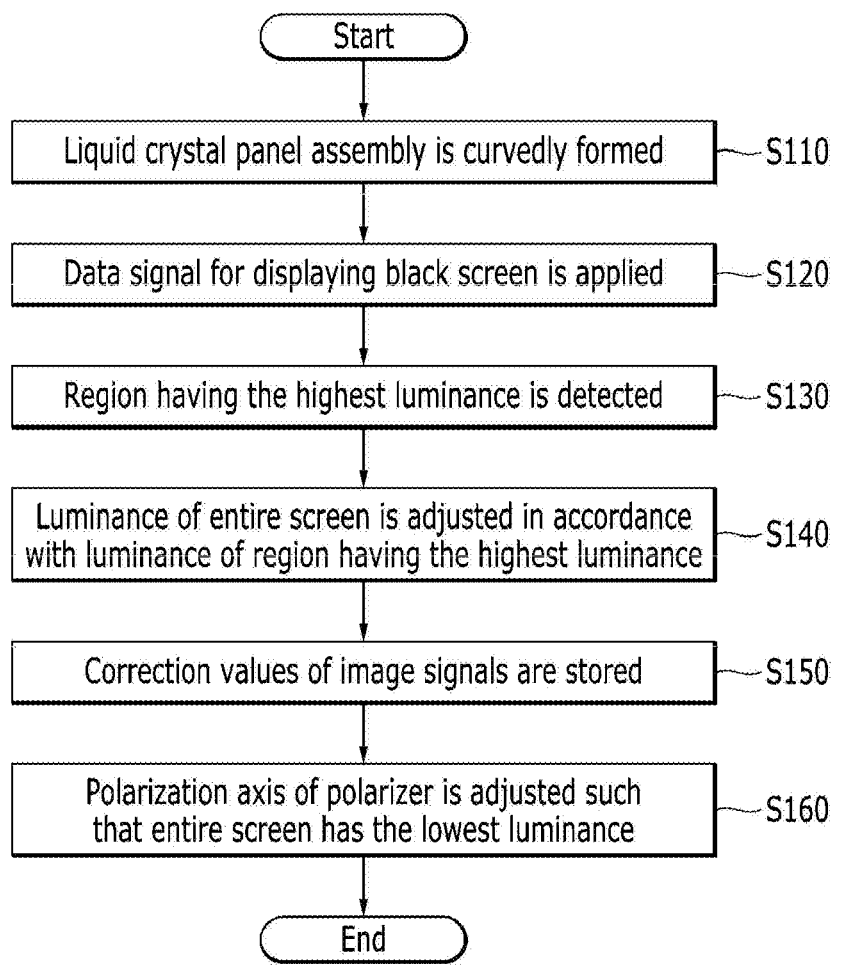
FIG. 9 is a flowchart for illustrating a manufacturing method of a curved LCD according to an exemplary embodiment of the present inventive concept.

FIG. 9 is a flowchart for illustrating a manufacturing method of a curved LCD according to an exemplary embodiment of the present inventive concept.

Figure 10:
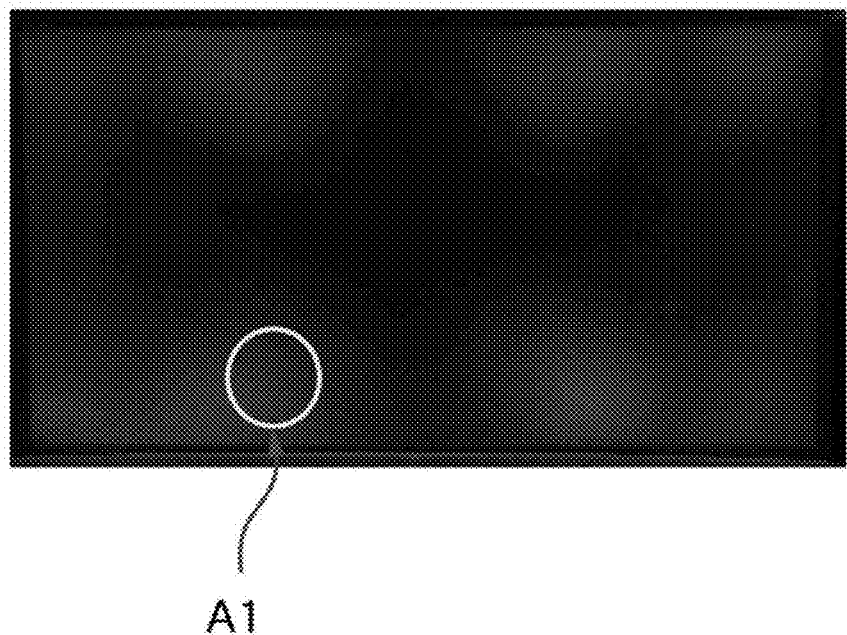
FIG. 10 is a drawing for illustrating one example of the luminance non-uniformity generated when a black screen is displayed on the curved liquid crystal panel assembly.

FIG. 10 is a drawing for illustrating one example of luminance non-uniformity generated when a black screen is displayed on a curved liquid crystal panel assembly.

Figure 11:
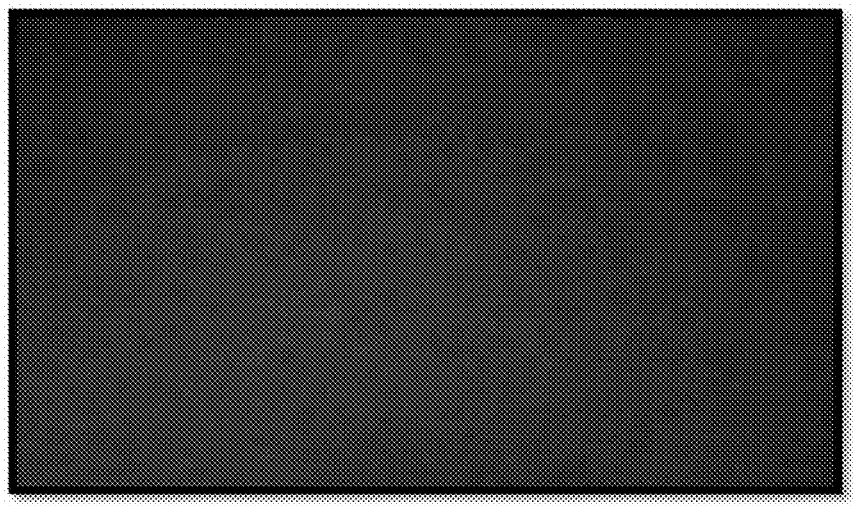
FIG. 11 is a drawing for illustrating one example in which luminance of an entire screen of the curved liquid crystal panel assembly is adjusted in accordance with a region having the highest luminance.

FIG. 11 is a drawing for illustrating one example in which luminance of an entire screen of the curved liquid crystal panel assembly is adaptively adjusted to a region having the highest luminance.

FIG. 11 is a drawing for illustrating one example in which luminance of an entire screen of the curved liquid crystal panel assembly is adjusted in accordance with a region having the highest luminance.

Referring to FIGS. 9 to 12, the liquid crystal panel assembly 1500 is a curved liquid crystal panel (S110).

A data signal for displaying the black is applied to the curved liquid crystal panel assembly 1500 (S120).

The data signal for displaying the black has a voltage that generates no electric field in the liquid crystal panel assembly 1500 in a normally black liquid crystal panel. The data signal for displaying the black has a voltage that generates maximum electric field in the liquid crystal panel assembly 1500 in a normally white liquid crystal panel As shown in FIG. 8, the luminance non-uniformity where a specific area is displayed brighter than its surrounding areas occurs on the black screen of the curved liquid crystal panel assembly 1500.

As illustrated in FIG. 10, the brighter area is actually viewed on the black screen.

The region having the highest luminance is detected by a luminance meter for measuring luminance of the screen (S130).

A camera and the like such as a charge-coupled device (CCD) may be used as the luminance meter.

Luminance values according to positions of the screen of the liquid crystal panel assembly 1500 can be measured using the luminance meter.

The luminance non-uniformity region displaying luminance of gray levels higher than a black gray level can be detected, and luminance of a part of the luminance non-uniformity region having the highest luminance can be detected.

Luminance of the entire screen of the liquid crystal panel assembly 1500 is adjusted to have the luminance of the region having the highest luminance (S140).

As illustrated in FIG. 10, when an A1 region has the highest luminance, the luminance of the entire screen can be adjusted to have the luminance of the A1 region by adjusting voltages of data signals that are applied to pixels corresponding to regions other than the A1 region.

For example, when the voltage of the data signal applied to the pixels PXs corresponding to the A1 region is 0 V, the voltages of the data signal applied to the plurality of pixels PXs corresponding to the regions other than A1 may be adjusted to a positive voltage or a negative voltage.

By adjusting the voltages of the data signal applied to the plurality of pixels PXs, the luminance of the entire screen can be adjusted to have the luminance of the A1 region, as illustrated in FIG. 11.

After the luminance of the entire screen is adjusted to have the luminance of the region having the highest luminance, correction values of the image signals R, G, and B are stored in the LUT (S150).

When the luminance of the entire screen is adjusted, the voltage of the adjusted data signal applied to each of the plurality of pixels PXs is determined.

The correction values of the image signals R, G, and B are determined such that a gray level 0 of the image signals R, G, and B corresponds to the voltage of the adjusted data signal, and the correction values of the image signals R, G, and B are stored in the LUT 1600.

After the luminance of the entire screen is adjusted to have the luminance of the region having the highest luminance, at least either one of the polarization axes of first and second polarizers POL1 and POL2 is adjusted such that the entire screen has the lowest luminance (S160).

The at least either one of the first and second polarizers POL1 and POL2 may be rotated on a plane by a predetermined angle in a clockwise direction or a counterclockwise direction to change a direction of the polarization axis.

When the luminance of the screen is measured while changing the direction of the polarization axis, the direction of the polarization axis in which the entire screen has the lowest luminance can be determined.

Figure 12:
FIG. 12 is a drawing for illustrating one example in which the luminance of the entire screen is adjusted at the lowest luminance by adjusting polarization axes of polarizers of the curved liquid crystal panel assembly.

As shown in FIG. 12, the black screen where no luminance non-uniformity appears and the entire screen has the lowest luminance can be obtained by adjusting the at least either one of the polarization axes of the first and second polarizers POL1 and POL2.

Accordingly, an angle formed by the polarization axis P1 of the first polarizer POL1 and the polarization axis P2 of the second polarizer POL2 is set to angles other than 90°.

If a radius of curvature of the liquid crystal panel assembly 1500, thicknesses of the first and second insulation substrates 110 and 210, and the like are set to have predetermined specifications, the angle determined by the aforementioned manufacturing method and formed by the polarization axis P1 of the first polarizer POL1 and the polarization axis P2 of the second polarizer POL2 may be fixed when the liquid crystal panel assemblies of the same size are manufactured since distribution of the luminance non-uniformity region can be normalized.

Polarization variations in the luminance non-uniformity region and in the normal region will now be described when a black image is displayed on the curved LCD of which at least either one of the polarization axes of the first and second polarizers POL1 and POL2 is adjusted according to the aforementioned manufacturing method.

Figure 13:
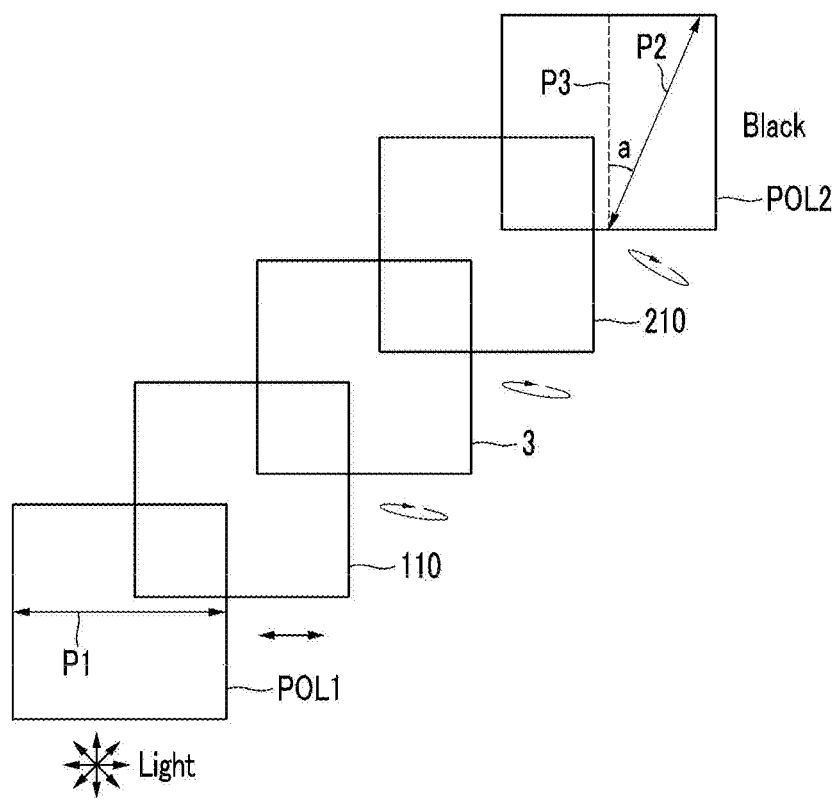
FIG. 13 is a top plan view for illustrating polarization variations in the luminance non-uniformity region in the curved LCD according to the exemplary embodiment of the present inventive concept.
Figure 14:
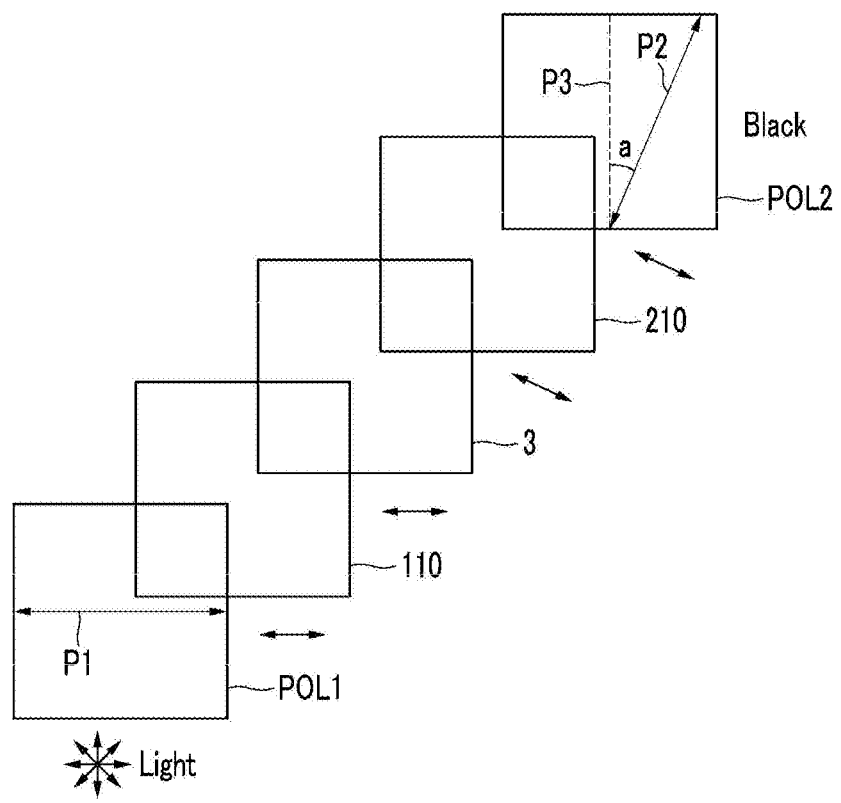
FIG. 14 is a top plan view for illustrating polarization variations in the normal region of the curved LCD according to the exemplary embodiment of the present inventive concept.
Figure 15:
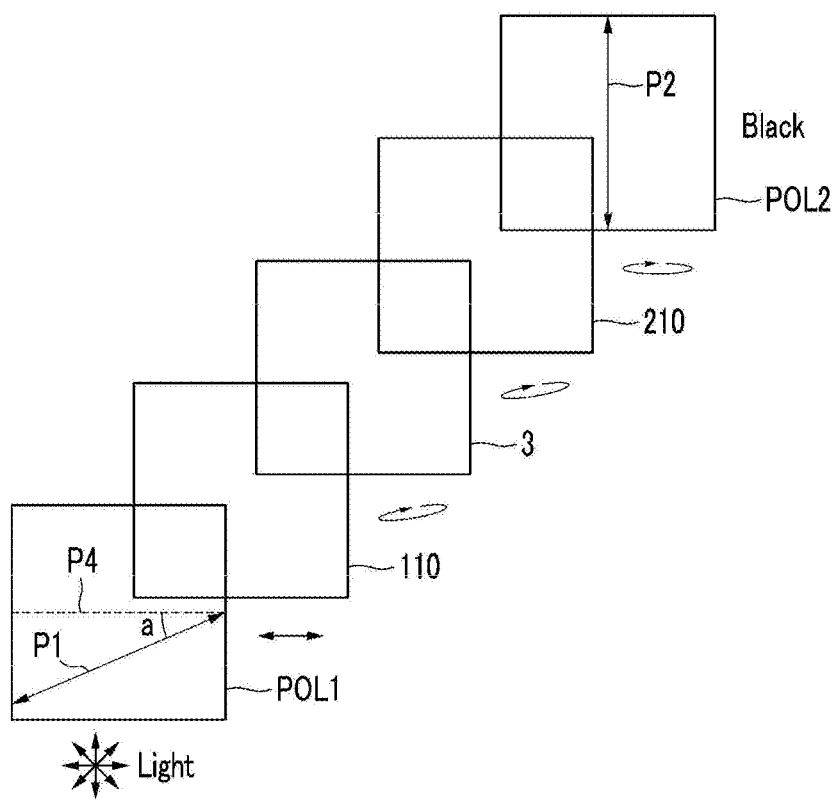
FIG. 15 is a top plan view for illustrating polarization variations in a luminance non-uniformity region of a curved LCD according to another exemplary embodiment of the present inventive concept.
Figure 16:
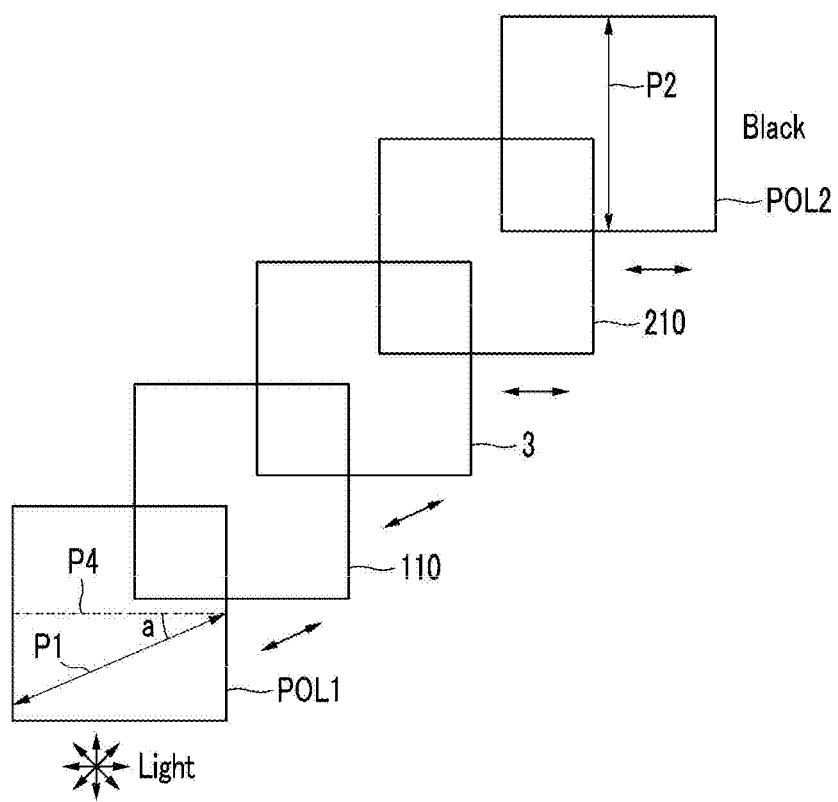
FIG. 16 is a top plan view for illustrating polarization variations in a normal region of a curved LCD according to another exemplary embodiment of the present inventive concept.
Figure 17:
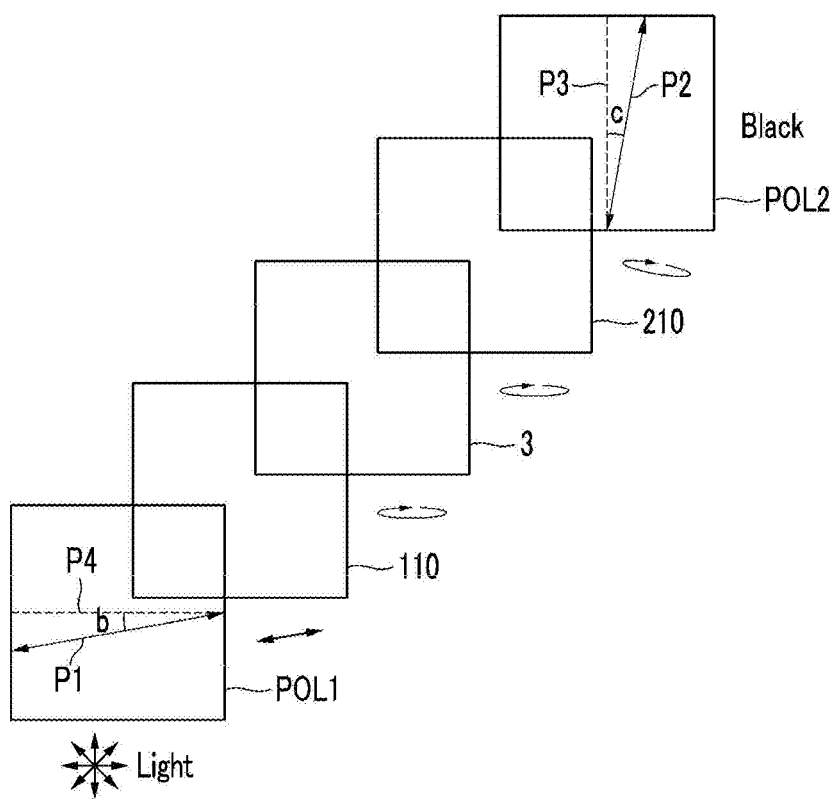
FIG. 17 is a top plan view for illustrating polarization variations in a luminance non-uniformity region of a curved LCD according to a further exemplary embodiment of the present inventive concept.
Figure 18:
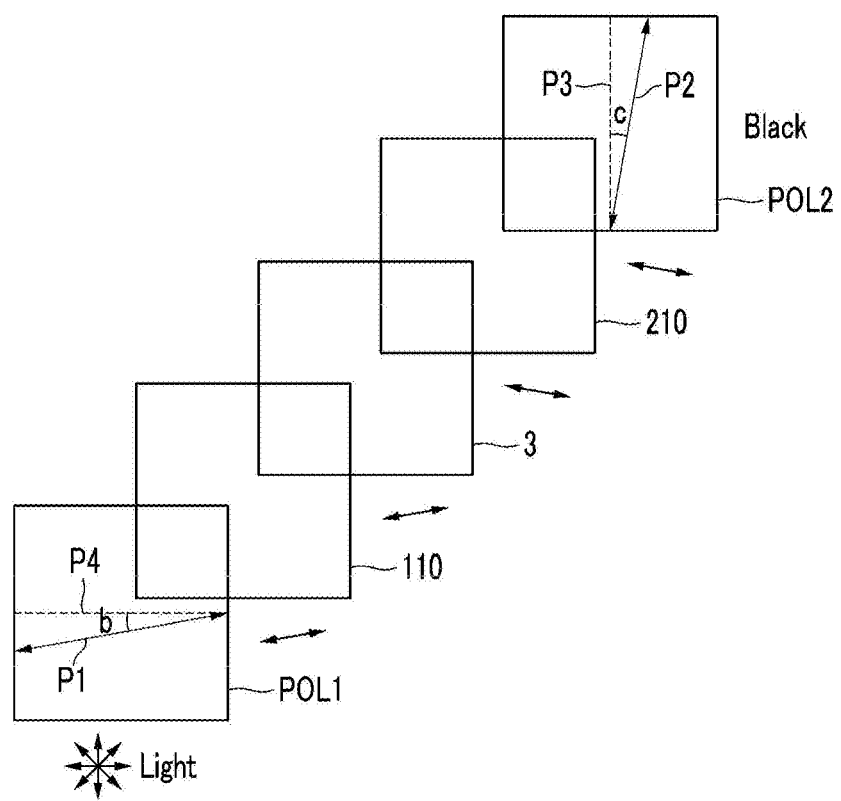
FIG. 18 is a top plan view for illustrating polarization variations in a normal region of a curved LCD according to the further exemplary embodiment of the present inventive concept.

FIGS. 13 and 14 illustrate cases in which the polarization axis P2 of the second polarizer POL2 is adjusted, FIGS. 15 and 16 illustrate cases in which the polarization axis P1 of the first polarizer POL1 is adjusted, and FIGS. 17 and 18 illustrate cases in which the polarization axis P1 of the first polarizer POL1 and the polarization axis P2 of the second polarizer POL2 are adjusted.

FIG. 13 is a top plan view for illustrating the polarization variations in the luminance non-uniformity region in the curved LCD according to the exemplary embodiment of the present inventive concept.

Referring to FIG. 13, light passing through the first polarizer POL1 has the first polarization axis P1.

Since the first insulation substrate 110 has birefringence in the luminance non-uniformity region, the polarized light in the direction of the first polarization axis P1 becomes elliptically polarized light after passing through the first insulation substrate 110.

The elliptically polarized light includes a polarization component in the direction of the first polarization axis P1, and a polarization component in a direction of a third polarization axis P3 that is perpendicular to the first polarization axis P1.

Since the luminance of the luminance non-uniformity region is identical to that of the region having the highest luminance A1 and the LUT is modified using the luminance non-uniformity region as a minimum gray level, an electric field is not applied to the liquid crystals i in the luminance non-uniformity region when display a black image.

The elliptically polarized light may be transmitted through the liquid crystal layer 3 with its polarization unchanged.

Since the second insulation substrate 210 also has birefringence in the luminance non-uniformity region, the elliptically polarized light may have increased polarization component in the direction of the third polarization axis P3 after passing through the second insulation substrate 210.

The second polarization axis P2 of the second polarizer POL2 is tilted by an angle "a" in the direction of the third polarization axis P3 that is perpendicular to the first polarization axis P1. That is, an angle formed by a first polarization axis and a second polarization axis does not meet at a right angle in a plan view. The angle formed by the first and second polarization axes P1 and P2 is 90°+a or 90°−a.

When viewed based on the direction of the second polarization axis P2, the elliptically polarized light passing through the second insulation substrate 210 may be a combination of a first polarization component having the direction of the second polarization axis P2 and a second polarization component having a direction that is perpendicular to the direction of the second polarization axis P2.

In this case, the direction of the second polarization axis P2 is tilted in the angle "a" at which the first polarization component of the elliptically polarized light becomes zero.

That is, based on the direction of the second polarization axis P2, the first polarization component of the elliptically polarized light passing through the second insulation substrate 210 becomes zero.

Accordingly, the elliptically polarized light is not allowed to pass through the second polarizer POL2 and thus a black image may be displayed.

FIG. 14 is a top plan view for illustrating the polarization variations in the normal region of the curved LCD according to the exemplary embodiment of the present inventive concept.

Referring to FIG. 14, light passing through the first polarizer POL1 has the first polarization axis P1.

Since the first insulation substrate 110 is an isotropic body in the normal region, the polarized light in the direction of the first polarization axis P1 passes through the first insulation substrate 110 with its polarization unchanged.

Since an electric field is applied to the liquid crystal in the normal region when the black image is displayed, the liquid crystal has a birefringence due to the applied electric field. Thus, the light passes through the liquid crystal has the polarization direction other than the first polarization axis p1.

It is assumed that the polarization direction is changed from the direction of the first polarization axis P1 by the angle "a" in the clockwise direction.

Since the second insulation substrate 210 is also an isotropic body in the normal region, the polarized light tilted by the angle "a" from the direction of the first polarization axis P1 in the clockwise direction is transmitted through the second insulation substrate 210 with its polarization unchanged.

Since the second polarization axis P2 of the second polarizer POL2 is tilted by the angle "a" from the direction of the third polarization axis P3 that is perpendicular to the first polarization axis P1, the second polarization axis P2 and the polarization axis of the light passes through the second insulation substrate may be perpendicular each other. Thus, the polarized light transmitted through the second insulation substrate 210 is not allowed to pass through the second polarizer POL2.

In this exemplary embodiment, the first polarization axis P1 may be parallel to two opposing edges of the liquid crystal panel assemble 150 and the second polarization axis P2 may not be parallel to two opposing edges of the liquid crystal panel assemble 150.

Accordingly, the black image may be displayed.

FIG. 15 is a top plan view for illustrating polarization variations in a luminance non-uniformity region of a curved LCD according to another exemplary embodiment of the present inventive concept.

Referring to FIG. 15, light passing through the first polarizer POL1 has a first polarization axis P1.

The first polarization axis P1 of the first polarizer POL1 is tilted by an angle from a direction of a fourth polarization axis P4 that is perpendicular to the second polarization axis P2 of the second polarizer POL2.

That is, an angle formed by the first polarization axis P1 and the second polarization axis P2 is 90°+a or 90°−a.

Since the first insulation substrate 110 has birefringence in the luminance non-uniformity region, the polarized light in the direction of the first polarization axis P1 becomes elliptically polarized light after passing through the first insulation substrate 110.

The elliptically polarized light includes a polarization component in the direction of the fourth polarization axis P4, and a polarization component in the direction of the second polarization axis P2 that is perpendicular to the fourth polarization axis P4.

Since an electric field is not applied to the liquid crystal layer 3, the elliptically polarized light is transmitted through the liquid crystal layer 3 with its polarization unchanged.

Since the second insulation substrate 210 also has birefringence in the luminance non-uniformity region, the elliptically polarized light passing through the liquid crystal layer 3 may have decreased polarization component in the direction of the second polarization axis P2 after passing through the second insulation substrate 210.

In this case, the first polarization axis P1 of the first polarizer POL1 is tilted by the angle "a" such that the polarization component of the elliptically polarized light transmitted through the second insulation substrate 210 becomes zero in the direction of the second polarization axis P2.

That is, the polarization component of the elliptically polarized light transmitted through the second insulation substrate 210 becomes zero in the direction of the second polarization axis P2.

Accordingly, the elliptically polarized light is not allowed to pass through the second polarizer POL2 and thus the black image may be displayed.

FIG. 16 is a top plan view for illustrating polarization variations in a normal region of a curved LCD according to another exemplary embodiment of the present inventive concept.

Referring to FIG. 16, light passing through the first polarizer POL1 has the first polarization axis P1.

The first polarization axis P1 of the first polarizer POL1 is tilted by an angle "a" from the direction of the fourth polarization axis P4 perpendicular to the second polarization axis P2 of the second polarizer POL2.

Since the first insulation substrate 110 is an isotropic body in the normal region, the polarized light in the direction of the first polarization axis P1 passes through the first insulation substrate 110 with its polarization unchanged.

Since an electric field is applied to the liquid crystals in the normal region when a black image is displayed, the polarized light in the direction of the first polarization axis P1 has its polarization direction changed by the birefringence of the liquid crystal layer 3 after passing through the liquid crystal layer 3.

It is assumed that the polarization direction is changed from the direction of the first polarization axis P1 in the clockwise direction by the angle "a".

That is, the polarized light transmitted through the liquid crystal layer 3 has the polarization direction of the fourth polarization axis P4 that is perpendicular to the polarization axis P2 of the second polarizer POL2.

Since the second insulation substrate 210 is also an isotropic body in the normal region, the polarized light in the direction of the fourth polarization axis P4 passes through the second insulation substrate 210 with its polarization unchanged.

In this exemplary embodiment, the second polarization axis P2 may be parallel to two opposing edges of the liquid crystal panel assemble 150 and the first polarization axis P2 may not be parallel to two opposing edges of the liquid crystal panel assemble 150.

Since the polarized light in the direction of the fourth polarization axis P4 is not allowed to pass through the second polarizer POL2, the black image may be displayed.

FIG. 17 is a top plan view for illustrating polarization variations in a luminance non-uniformity region of a curved LCD according to a further exemplary embodiment of the present inventive concept.

Referring to FIG. 17, when the third polarization axis P3 and the fourth polarization axis P4 are perpendicular to each other, the first polarization axis P1 of the first polarizer POL1 is tilted by an angle "b" from the direction of the fourth polarization axis P4, and the second polarization axis P2 of the second polarizer POL2 is tilted by an angle "c" from the direction of the third polarization axis P3.

That is, an angle formed by the first polarization axis P1 and the second polarization axis P2 is 90°+b+c or 90−(b+c).

Herein, "b+c" may be same to "a" that previously described in FIGS. 13 to 16.

Light passing through the first polarizer POL1 has the first polarization axis P1.

The polarized light in the direction of the first polarization axis P1 includes a polarization component in the direction of the third polarization axis P3.

Since the first insulation substrate 110 has birefringence in the luminance non-uniformity region, the polarized light in the direction of the first polarization axis P1 may have decreased polarization component in the direction of the third polarization axis P3 after passing through the first insulation substrate 110, thereby becoming elliptically polarized light.

Since an electric field is not generated in the liquid crystal layer 3, the elliptically polarized light passes through the liquid crystal layer 3 with its polarization unchanged.

Since the second insulation substrate 210 also has birefringence in the luminance non-uniformity region, the elliptically polarized light transmitted through the liquid crystal layer 3 may have increased polarization component in the direction of the third polarization axis P3 after passing through the second insulation substrate 210.

The second polarization axis P2 of the second polarizer POL2 is tilted by the angle "c" such that a polarization component of the elliptically polarized light transmitted through the second insulation substrate 210 in the direction of the second polarization axis P2 becomes zero.

That is, the polarization component of the elliptically polarized light passing through the second insulation substrate 210 in the direction of the second polarization axis P2 becomes zero.

Accordingly, since the elliptically polarized light is not allowed to pass through the second polarizer POL2, the black image can be displayed.

FIG. 18 is a top plan view for illustrating polarization variations in a normal region of a curved LCD according to the further exemplary embodiment of the present inventive concept.

Referring to FIG. 18, When the third polarization axis P3 and the fourth polarization axis P4 are perpendicular to each other, the first polarization axis P1 of the first polarizer POL1 is tilted by an angle "b" from the direction of the fourth polarization axis P4, and the second polarization axis P2 of the second polarizer POL2 is tilted by an angle "c" from the direction of the third polarization axis P3.

Light passing through the first polarizer POL1 has the first polarization axis P1.

Since the first insulation substrate 110 is an isotropic body in the normal region, the polarized light in the direction of the first polarization axis P1 passes through the first insulation substrate 110 with its polarization unchanged.

Since an electric field is applied to the normal region when a black image is displayed, the polarized light in the direction of the first polarization axis P1 has its polarization direction changed by the electric field that is applied to the liquid crystal layer 3 while being transmitted through the liquid crystal layer 3.

It is assumed that the polarization direction is changed from the direction of the first polarization axis P1 by an angle "b+c" in the clockwise direction.

That is, the polarized light transmitted through the liquid crystal layer 3 has the polarization direction that is perpendicular to the polarization axis P2 of the second polarizer POL2.

Since the second insulation substrate 210 is also an isotropic body in the normal region, the polarized light passing through the liquid crystal layer 3 passes through the second insulation substrate 210 with its polarization unchanged.

Since the polarized light transmitted through the liquid crystal layer 3 is perpendicular to the second polarization axis P2 and thus is not allowed to pass through the second polarizer POL2, the black image can be displayed.

In this exemplary embodiment, the first and the second polarization axis pP1 and P2 may not be parallel to edges of the liquid crystal panel assemble 150. The accompanying drawings and the detailed description of the inventive concept are only illustrative, and are used for the purpose of describing the present inventive concept but are not used to limit the meanings or scope of the present inventive concept described in the claims.

Therefore, those skilled in the art will understand that various modifications and other equivalent embodiments of the present inventive concept are possible.

Consequently, the true technical protective scope of the present inventive concept must be determined based on the technical spirit of the appended claims.

What is claimed is:

1. A curved liquid crystal display (LCD) comprising
a curved liquid crystal panel assembly, wherein
the curved liquid crystal panel assembly includes:
a lower panel including a first linear polarizer having a first polarization axis;
an upper panel including a second linear polarizer having a second polarization axis and
a liquid crystal layer interposed between the lower panel and the upper panel,
wherein an angle formed by a first polarization axis of the first linear polarizer and a second polarization axis of the second linear polarizer is crossing and does not meet at a right angle in a plan view.

2. The curved LCD of claim 1, wherein the second polarization axis of the second polarizer forms a predetermined angle from a direction of a third polarization axis that is perpendicular to the first polarization axis.

3. The curved LCD of claim 1, wherein the first polarization axis of the first polarizer forms a predetermined angle from a direction of a fourth polarization axis that is perpendicular to the second polarization axis.

4. The curved LCD of claim 1, wherein the first polarization axis of the first polarizer forms a first angle from a direction of a fourth polarization axis, and the second polarization axis of the second polarizer forms a second angle from a direction of a third polarization axis that is perpendicular to the fourth polarization axis.

5. The curved LCD of claim 1, further comprising a lookup table for storing correction values of an image signal, the lookup table including different values for a minimum gray level depending on a position of the curved liquid crystal panel assembly.

6. The curved LCD of claim 5, wherein, when a black image is displayed on the curved liquid crystal panel assembly, no electric field is configured to be applied to a luminance non-uniformity region, which has a lowest lookup table value for a minimum gray level, while an electric field is configured to be applied to a normal region other than the luminance non-uniformity region.

7. The curved LCD of claim 5, wherein when a black image is displayed on the curved liquid crystal panel assembly, the voltage of the data signal applied to a luminance non-uniformity region, which has a lowest lookup table value for a minimum gray level, is different from that of the data signal applied to a normal region other than the luminance non-uniformity region.

8. A curved LCD comprising:
a curved liquid crystal panel assembly;
a lookup table for storing correction values of image signals for a luminance non-uniformity region where luminance non-uniformity generated in the curved liquid crystal panel assembly appears and a normal region other than the luminance non-uniformity region; and
a signal controller for generating an image data signal for displaying an image based on the correction values of the image signals,
wherein the curved liquid crystal panel assembly includes: a lower panel including a first polarizer; an upper panel including a second polarizer; and a liquid crystal layer interposed between the lower panel and the upper panel, and
wherein an angle formed by a first polarization axis of the first polarizer and a second polarization axis of the second polarizer is crossing and do not meet at a right angle in a plan view.

9. The curved LCD of claim 8, wherein, the lookup table including different values for a minimum gray level according to a position of the curved liquid crystal panel assembly.

10. The curved LCD of claim 9, wherein the second polarization axis of the second polarizer forms a predetermined angle from a direction of a third polarization axis that is perpendicular to the first polarization axis.

11. The curved LCD of claim 9, wherein the first polarization axis of the first polarizer forms a predetermined angle from a direction of a fourth polarization axis that is perpendicular to the second polarization axis.

12. A manufacturing method of a curved LCD comprising:
preparing a curved liquid crystal panel assembly including a lower panel including a first polarizer, an upper panel including a second polarizer, and a liquid crystal layer interposed between the lower panel and the upper panel;
applying a data signal for displaying a black image to the liquid crystal panel assembly;
detecting a region having the highest luminance from a screen of the liquid crystal panel assembly;
adjusting luminance of an entire screen of the liquid crystal panel assembly to have the same luminance of the region having the highest luminance; and
adjusting at least one of polarization axes of the first and second polarizers such that the entire screen has the lowest luminance,
wherein the polarization axes of the first and the second polarizers cross each other and do not meet at a right angle in a plan view.

13. The manufacturing method of claim 12, wherein the second polarization axis of the second polarizer forms a predetermined angle from a direction of a third polarization axis that is perpendicular to the first polarization axis.

14. The manufacturing method of claim 12, wherein the first polarization axis of the first polarizer forms a predetermined angle from a direction of a fourth polarization axis direction that is perpendicular to the second polarization axis.

15. The manufacturing method of claim 12, wherein the first polarization axis of the first polarizer forms a first angle from a direction of a fourth polarization axis, and the second polarization axis of the second polarizer forms a second angle from a direction of a third polarization axis that is perpendicular to the fourth polarization axis.

16. The manufacturing method of claim 12, wherein no electric field is applied to the region having the highest luminance when applying a data signal for displaying a black image to the liquid crystal panel assembly.

17. The manufacturing method of claim 12, wherein a voltage of a data signal applied to each of a plurality of pixels corresponding to regions other than the region having the highest luminance is adjusted to have the same luminance as the region having the highest luminance throughout the liquid crystal panel assembly.

18. The manufacturing method of claim 17, further comprising storing correction values of image signals in a look-up table such that the voltages of the adjusted data signal corresponds to a minimum gray level of each image signal.

* * * * *